United States Patent
Hsieh et al.

(10) Patent No.: US 8,493,023 B2
(45) Date of Patent: Jul. 23, 2013

(54) CHARGE APPARATUS AND METHOD USING THE SAME

(75) Inventors: Hsing-Yuan Hsieh, Shindian (TW); Jing Zhang, Shenzhen (CN)

(73) Assignees: Shenzhen Futaihong Precision Industry Co., Ltd., Shenzhen (CN); FIH (Hong Kong) Limited, Kowloon (HK)

( * ) Notice: Subject to any disclaimer, the term of this patent is extended or adjusted under 35 U.S.C. 154(b) by 442 days.

(21) Appl. No.: 12/788,432

(22) Filed: May 27, 2010

(65) Prior Publication Data
US 2011/0175566 A1    Jul. 21, 2011

(30) Foreign Application Priority Data
Jan. 19, 2010    (CN) .......................... 2010 1 0300460

(51) Int. Cl.
*H02J 7/00* (2006.01)
*H02J 7/04* (2006.01)

(52) U.S. Cl.
USPC ............ 320/107; 320/128; 320/140; 320/137

(58) Field of Classification Search
USPC ......................................... 320/107, 128, 140
See application file for complete search history.

(56) References Cited

U.S. PATENT DOCUMENTS

| | | | | |
|---|---|---|---|---|
| 4,481,449 A * | 11/1984 | Rodal | ........................... | 318/375 |
| 5,204,608 A * | 4/1993 | Koenck | ........................ | 320/112 |
| 5,558,071 A * | 9/1996 | Ward et al. | ..................... | 123/598 |
| 5,994,875 A * | 11/1999 | Lee | ............................... | 320/132 |
| 6,005,371 A * | 12/1999 | Umetsu | ....................... | 320/148 |
| 6,329,796 B1 * | 12/2001 | Popescu | ....................... | 320/134 |
| 7,940,026 B2 * | 5/2011 | Fadell et al. | .................. | 320/128 |
| 2011/0163723 A1 * | 7/2011 | Tan et al. | ...................... | 320/134 |

* cited by examiner

*Primary Examiner* — M'Baye Diao
(74) *Attorney, Agent, or Firm* — Altis Law Group, Inc.

(57) ABSTRACT

A charge apparatus used to regulate the power outputted by a power supply to charge a battery includes a voltage regulating module, a protection circuit, a timing module and a switch control module. The voltage regulating module is configured to connect the power supply to the battery and regulate electrical energy outputted from the power supply to charge the battery. The protection circuit detects a voltage of the battery and generates a triggering signal when the voltage of the battery reaches a preset voltage. The timing module receives the triggering signal to begin a timing process. The switch control module controls the voltage regulating module to stop charging the battery when the timing process ends.

15 Claims, 4 Drawing Sheets

| Charging state of the battery | The first input contact of the OR gate connected to the protection circuit | The first input contact of the OR gate connected to the first output contact of the timer | The first output contact of the OR gate | The second input contact of the AND gate connected the rectifier | The second output contact of the AND gate |
|---|---|---|---|---|---|
| The detected voltage of the battery is lower than the preset voltage | 1 | 0 | 1 | 1 | 1 |
| The detected voltage of the battery equal the preset voltage and the timing process begins | 0 | 1 | 1 | 1 | 1 |
| The timing process ends | 0 | 0 | 0 | 1 | 0 |

FIG. 3

CHARGE APPARATUS AND METHOD USING THE SAME

BACKGROUND

1. Technical Field

The disclosure generally relates to charge apparatuses, particularly to a charge apparatus for a portable electronic device and charge method using the charge apparatus.

2. Description of Related Art

A mobile phone commonly obtains power from a rechargeable battery such as a lithium ion (Li+) battery. Rechargeable batteries need to be recharged via an adapter associated with the mobile phone, and can be considered fully recharged when the voltage of the battery arrives at a stable voltage. For example, the stable voltage of a Li+ battery is about 4.2V. However, if the adapter remains connected to the battery, the charger may continue to send a charge to the battery and damage the battery through overcharging.

Therefore, there is room for improvement within the art.

BRIEF DESCRIPTION OF THE DRAWINGS

Many aspects of the charge apparatus and method using the same can be better understood with reference to the following drawings. The components in the drawings are not necessarily drawn to scale, the emphasis instead being placed upon clearly illustrating the principles of the charge apparatus and method using the same.

FIG. 3 is a truth table of a switch control circuit of the charge apparatus of FIG. 1, during a charge process.

DETAILED DESCRIPTION

Figure 1:
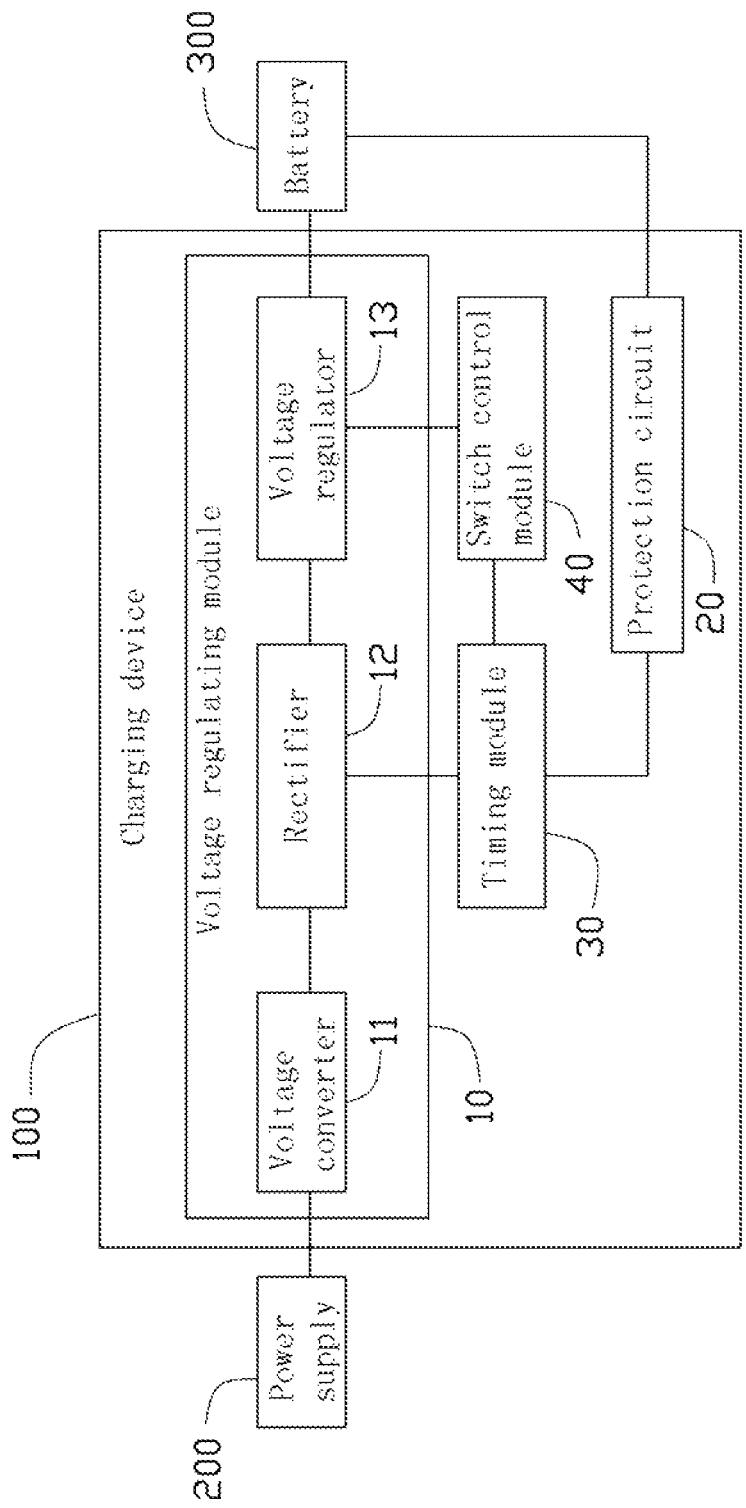
FIG. 1 is a block diagram of a charge apparatus, according to an exemplary embodiment.

Referring to FIG. 1, a charge apparatus 100 used to regulate the power outputted by a power supply 200 to charge a battery 300 of a portable electronic device (not shown) such as a mobile phone, according to one exemplary embodiment. The charge apparatus 100 includes a voltage regulating module 10, a protection circuit 20, a timing module 30, and a switch control module 40. The power supply 200 may be a power source in the portable electronic device, or an external power source.

The voltage regulating module 10 includes a voltage converter 11, a rectifier 12, and a voltage regulator 13 connected in series. The voltage converter 11 is configured to be connected to the power supply 200. The voltage regulator 13 is configured to be connected to the battery 300. The power supply 200 outputs electrical energy to the voltage converter 11. The voltage regulating module 10 regulates the electrical energy by the voltage converter 11, the rectifier 12, and the voltage regulator 13 and supplies the regulated electrical energy to charge the battery 300. The regulated electrical energy is generally direct current (DC) and has a voltage of about 10 V.

The protection circuit 20 is connected to the battery 300 and the timing modules 30. The protection circuit 20 has preset a voltage therein. The protection circuit 20 detects a voltage of the battery 300 and determines whether the detected voltage of the battery 300 reaches to the preset voltage. When the detected voltage of the battery 300 equals the preset voltage, the protection circuit 20 generates a triggering signal and sends the triggering signal to the timing module 30.

Figure 2:
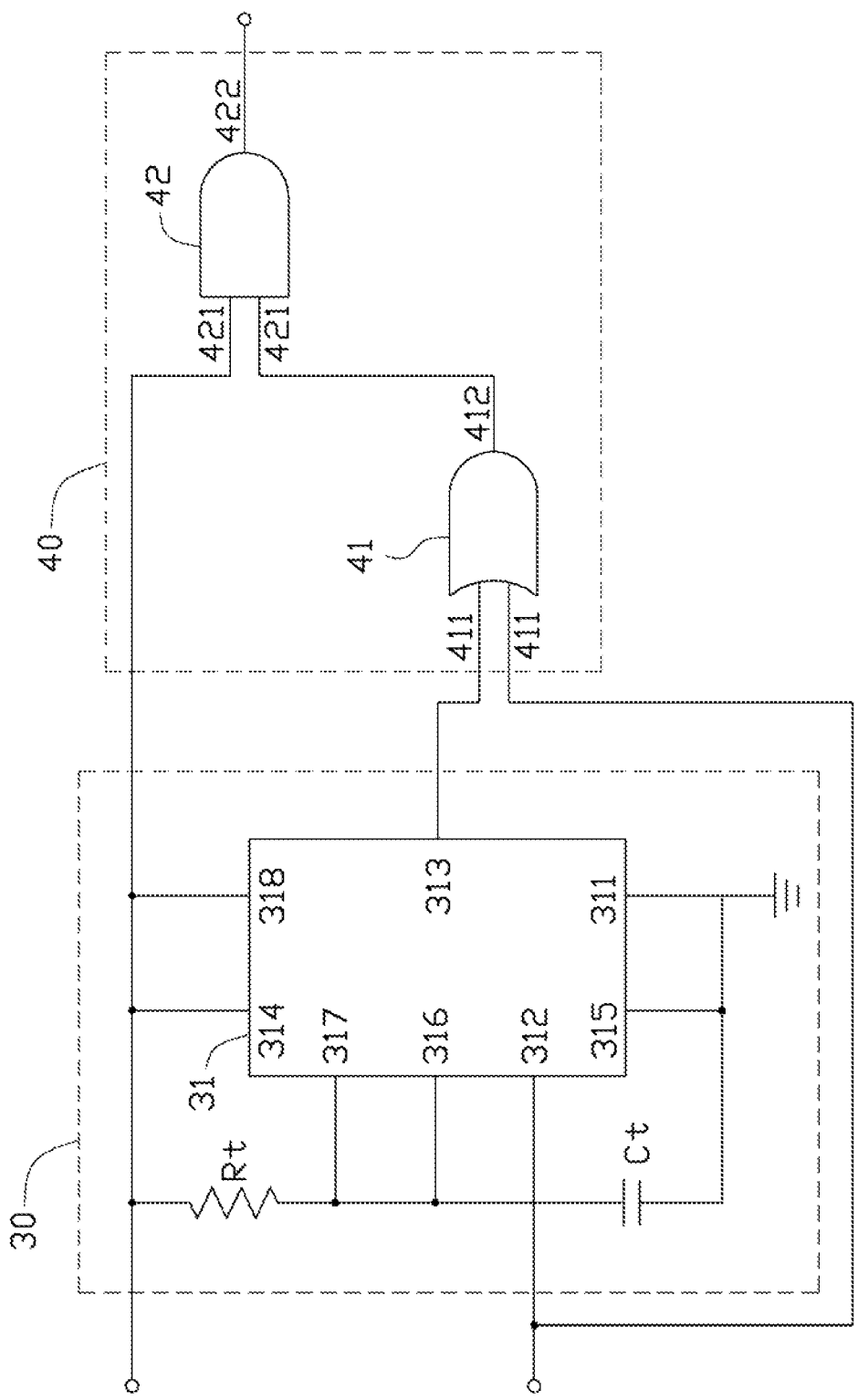
FIG. 2 is a circuit diagram of a timing module and a switch control module of the charge apparatus of FIG. 1.

The timing module 30 is connected to the rectifier 12, and to the voltage regulator 13 by the switch control module 40. Referring to FIG. 2, the timing module 30 includes a resistor Rt, a capacitor Ct, and a timer 31. The resistor Rt and the capacitor Ct are connected in series between the voltage regulator 13 and ground. The timer 31 includes a grounding contact 311, a triggering contact 312, an output contact 313, a reset contact 314, a control contact 315, a threshold contact 316, a discharging contact 317 and a power contact 318. The grounding contact 311 is connected to ground. The triggering contact 312 is connected to the protection circuit 20 to receive the triggering signal sent from the protection circuit 20. The output contact 313 is connected to the switch control module 40. The reset contact 314 is connected to the rectifier 12 of the voltage regulating module 10. The control contact 315 is connected to ground. The threshold contact 316 and the discharging contact 317 are connected to a connection (not labeled) between the resistor Rt and the capacitor Ct. The power contact 318 is connected to the rectifier 12 of the voltage regulating module 10.

The timing module 30 includes an initial mode and a timing mode. When in the initial mode, the output contact 313 outputs a low voltage signal, such as less than 5V, representing logic 0. When the triggering contact 312 receives a trigger signal from the protection circuit 20, the timing module 30 converts into the timing mode from the initial mode. The output contact 313 outputs a high voltage signal, such as 5V or more, representing logic 1. During the timing mode, the rectifier 12 charges the capacitor Ct by the resistor Rt. The timing process ends when the capacitor Ct is fully charged, and then the output contact 313 of the timing module 30 outputs the low voltage signal again. The logic voltage signal change of the output contact 313 of the timing module 30 drives the switch control module 40 to stop charging the battery 300.

The switch control module 40 includes an OR gate 41 and an AND gate 42. The OR gate 41 includes two first input contacts 411 and a first output contact 412. The two first input contacts 411 are respectively connected to the protection circuit 20 and the output contact 313 of the timing module 30. The first output contact 412 outputs a voltage signal generated from the voltage levels of the protection circuit 20 and the output contact 313 by an OR operation. The AND gate 42 includes two second input contacts 421 and a second output contact 422. One second input contact 421 is connected to the rectifier 12 and obtains the regulated voltage from the rectifier 12 as a high voltage signal representing logic 1. Another second input contact 421 is connected to the first output contact 412 of the OR gate 41. The second output contact 422 outputs a voltage signal generated from the voltage levels of the rectifier 12 and the first output contact 412 of the OR gate 41 by an AND operation.

Referring to FIG. 3, when the voltage of the battery 300 is less than or equal to the preset voltage of the protection circuit 20, the second output contact 422 outputs a high voltage signal, such as 5V or more, representing logic 1, and the voltage regulating module 10 charges the battery 300. When the voltage of the battery 300 is higher than the preset voltage of the protection circuit 20 and the timing process ends, the second output contact 422 outputs a low voltage signal, such as less than 5V, representing logic 0, and the switch control module 40 controls the voltage regulating module 10 to stop charging the battery 300.

Figure 4:
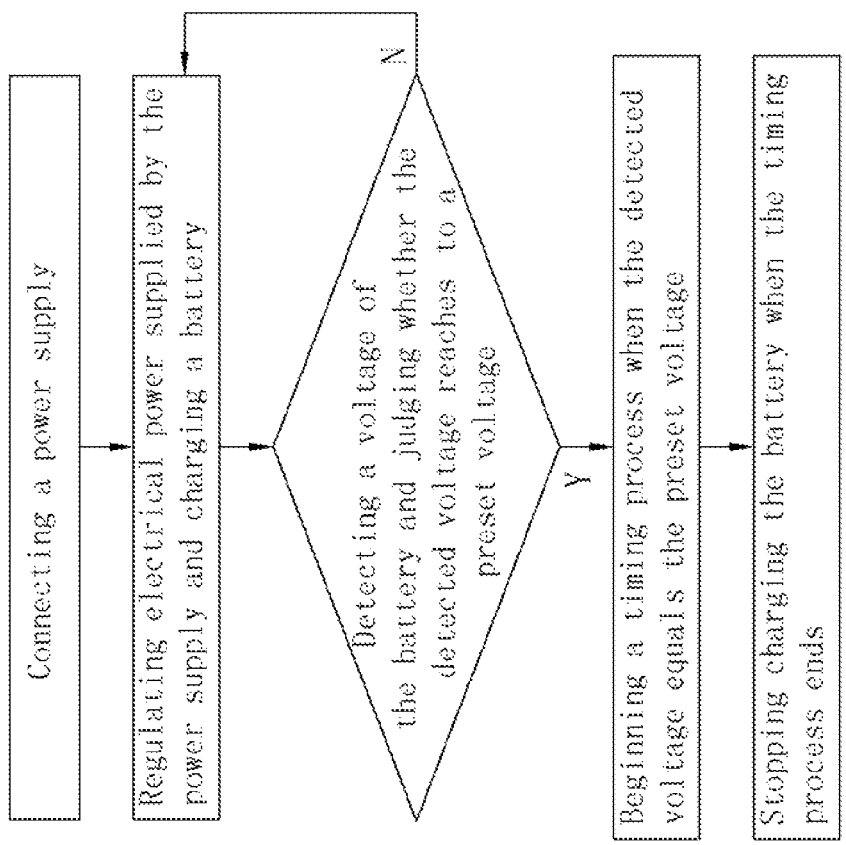
FIG. 4 is a flow chart of the charge process of the charge apparatus of FIG. 1.

Referring to FIG. 4, the process of charging the battery 300 by the charge device 100 may includes following steps:

The voltage converter 11 of the voltage regulating module 10 is connected to the power supply 200. The voltage regulator 13 of the voltage regulating module 10 and the protection circuit 20 are connected to the battery 300.

The protection circuit 20 detects the voltage of the battery 300, and determines whether the detected voltage of the battery 300 reaches to a preset voltage preset therein. When the detected voltage equals the preset voltage of the battery 300, the protection circuit 20 generates a triggering signal and sends the triggering signal to the timing module 30, and the timing module 30 begins a timing process. When the detected voltage is lower than the preset voltage of the battery 300, the regulating module 10 charges the battery 300.

When the timing process ends, the timing module 30 generates a logic voltage signal change to drive the switch control module 40 to stop charging the battery 300.

The switch control module 40 controls the voltage regulator 13 to stop charging the battery 200 when the voltage of the battery 200 equals the preset voltage to reduce electrical energy consumption and avoid overcharging.

It is believed that the exemplary embodiments and their advantages will be understood from the foregoing description, and it will be apparent that various changes may be made thereto without departing from the spirit and scope of the disclosure or sacrificing all of its material advantages, the examples hereinbefore described merely being preferred or exemplary embodiments of the disclosure.

What is claimed is:

1. A charge apparatus used to regulate the power outputted by a power supply to charge a battery; comprising:
   a voltage regulating module configured to connect the power supply to the battery, and regulating electrical energy output from the power supply to charge the battery;
   a protection circuit detecting a voltage of the battery and generating a triggering signal when the voltage of the battery equals a preset voltage;
   a timing module receiving the triggering signal to begin a timing process; and
   a switch control module controlling the voltage regulating module to stop charging the battery when the timing process ends; wherein the timing module includes a resistor, a capacitor and a timer, the resistor and the capacitor are series connected between the voltage regulating module and ground, the timer includes a grounding contact connected to ground, a triggering contact connected to the protection circuit, an output contact connected to the switch control module, a threshold contact and a discharging contact connected to a connection between the resistor and capacitor, and a power contact connected to the voltage regulating module.

2. The charge apparatus as claimed in claim 1, wherein when the timing module receives the triggering signal, the output contact of the timer outputs a high voltage signal from a low voltage signal; when the timing process ends, the output contact of the timer outputs the low voltage signal.

3. The charge apparatus as claimed in claim 1, wherein the switch control module includes an OR gate and an AND gate, the OR gate includes two first input contacts respectively connected to the protection circuit and the timing module, and a first output contact; the AND gate includes two second input contacts respectively connected to the voltage regulating module and the first output contact of the OR gate and a second output contact connected to the voltage regulating module.

4. The charge apparatus as claimed in claim 3, wherein when the voltage of the battery is lower than or equal to the preset voltage of the protection circuit, the second output contact outputs a high voltage signal; when the voltage of the battery is higher than the preset voltage of the protection circuit and the timing process ends, the second output contact outputs a low voltage signal.

5. The charge apparatus as claimed in claim 1, wherein the voltage regulating module includes a voltage converter, a rectifier, and a voltage regulator connected in series.

6. The charge apparatus as claimed in claim 1, wherein when the timing module receives the triggering signal, the output contact of the timer outputs a high voltage signal from a low voltage signal; when the timing process ends, the output contact of the timer outputs the low voltage signal.

7. A charge apparatus used to regulate the power outputted by a power supply to charge a battery; comprising:
   a voltage regulating module configured to connect the power supply to the battery, and regulating electrical energy output from the power supply to charge the battery;
   a protection circuit connected to the battery to detect a voltage of the battery and generating a triggering signal when the voltage of the battery equals a preset voltage;
   a timing module connected to the voltage regulating module and the protection circuit to receive the triggering signal and beginning a timing process; and
   a switch control module connected to the timing module and the voltage regulating module and controlling the voltage regulating module to stop charging the battery when the timing process ends; wherein the timing module includes a resistor, a capacitor and a timer, the resistor and the capacitor are connected in series between the voltage regulating module and ground, the timer includes a grounding contact connected to ground, a triggering contact connected to the protection circuit, an output contact connected to the switch control module, a threshold contact and a discharging contact connected to a connection between the resistor and capacitor, and a power contact connected to the voltage regulating module.

8. The charge apparatus as claimed in claim 7, wherein the switch control module includes an OR gate and an AND gate, the OR gate includes two first input contacts respectively connected to the protection circuit and the timing module, and a first output contact; the AND gate includes two second input contacts respectively connected to the voltage regulating module and the first output contact of the OR gate and a second output contact connected to the voltage regulating module.

9. The charge apparatus as claimed in claim 8, wherein when the voltage of the battery is less than or equal to the preset voltage of the protection circuit, the second output contact outputs a high voltage signal; when the voltage of the battery is higher than the preset voltage of the protection circuit and the timing process ends, the second output contact outputs a low voltage signal.

10. The charge apparatus as claimed in claim 7, wherein the voltage regulating module includes a voltage converter, a rectifier, and a voltage regulator connected in series.

11. A charge apparatus used to regulate the power outputted by a power supply to charge a battery; comprising:
   a voltage regulating module configured to connect the power supply to the battery, and regulating electrical energy output from the power supply to charge the battery;

a protection circuit detecting a voltage of the battery and generating a triggering signal when the voltage of the battery equals a preset voltage;

a timing module receiving the triggering signal to begin a timing process; and a switch control module controlling the voltage regulating module to stop charging the battery when the timing process ends; wherein the switch control module includes an OR gate and an AND gate, the OR gate includes two first input contacts respectively connected to the protection circuit and the timing module, and a first output contact; the AND gate includes two second input contacts respectively connected to the voltage regulating module and the first output contact of the OR gate and a second output contact connected to the voltage regulating module.

12. The charge apparatus as claimed in claim 11, wherein the timing module includes a resistor, a capacitor and a timer, the resistor and the capacitor are series connected between the voltage regulating module and ground, the timer includes a grounding contact connected to ground, a triggering contact connected to the protection circuit, an output contact connected to the switch control module, a threshold contact and a discharging contact connected to a connection between the resistor and capacitor, and a power contact connected to the voltage regulating module.

13. The charge apparatus as claimed in claim 12, wherein when the timing module receives the triggering signal, the output contact of the timer outputs a high voltage signal from a low voltage signal; when the timing process ends, the output contact of the timer outputs the low voltage signal.

14. The charge apparatus as claimed in claim 11, wherein when the voltage of the battery is lower than or equal to the preset voltage of the protection circuit, the second output contact outputs a high voltage signal; when the voltage of the battery is higher than the preset voltage of the protection circuit and the timing process ends, the second output contact outputs a low voltage signal.

15. The charge apparatus as claimed in claim 11, wherein the voltage regulating module includes a voltage converter, a rectifier, and a voltage regulator connected in series.

* * * * *